Sept. 11, 1923.
G. M. BARKER
BASKET COVER FASTENER
Filed April 18, 1922
1,467,891
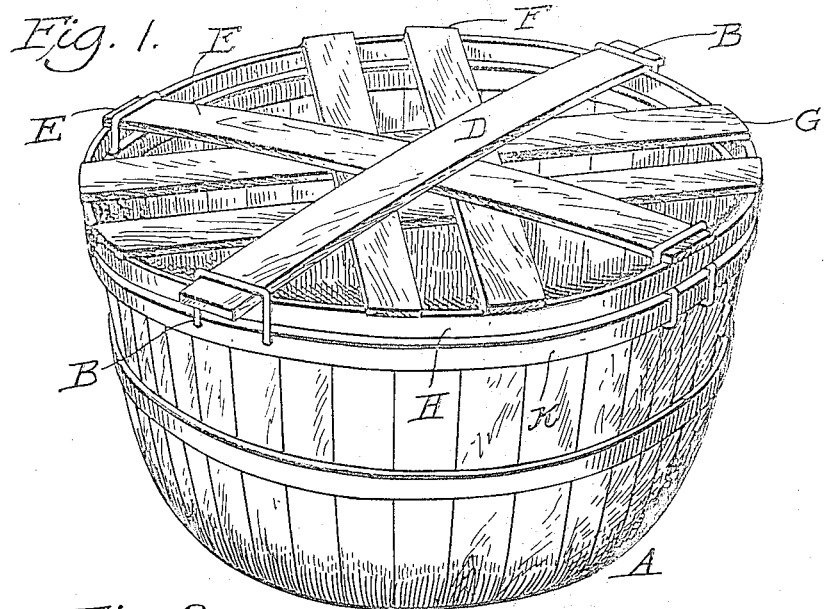
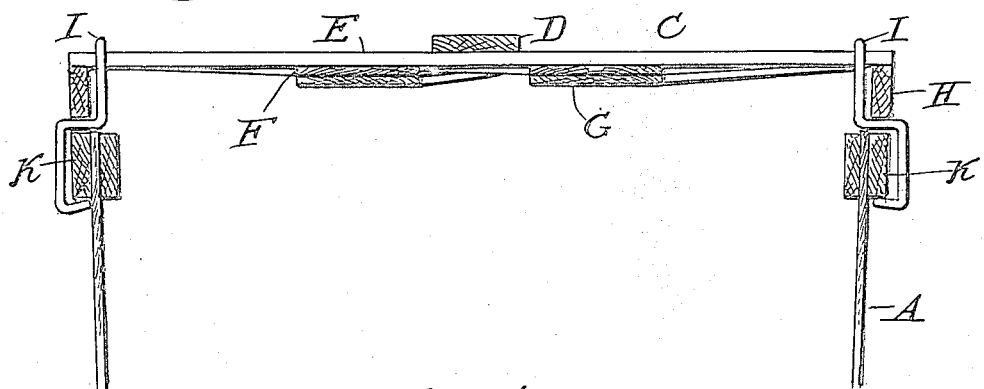
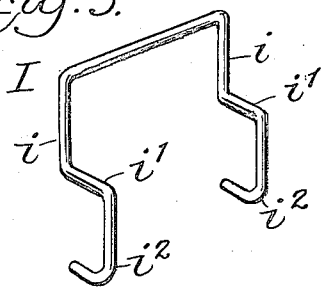
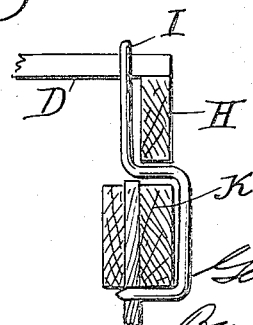
Inventor
George M. Barker
By Julian C. Dowell
His Attorney Patented Sept. 11, 1923.

1,467,891

UNITED STATES PATENT OFFICE.

GEORGE M. BARKER, OF MACON, GEORGIA.

BASKET-COVER FASTENER.

Application filed April 18, 1922. Serial No. 554,460.

*To all whom it may concern:*

Be it known that I, GEORGE M. BARKER, a citizen of the United States, residing at Macon, in the county of Bibb and State of Georgia, have invented certain new and useful Improvements in Basket-Cover Fasteners; and I do hereby declare the following to be a full, clear, and exact description of the invention, such as will enable others skilled in the art to which it appertains to make and use the same.

This invention relates to basket top or cover fasteners, and more particularly to fasteners for the tops of fruit and vegetable baskets.

The object of the invention is to provide simple, inexpensive, and efficient means for firmly securing and holding in place a removable top or cover of a fruit or vegetable basket without using nails, screws, or extraneous fastening means, such as are ordinarily employed for securing the tops or covers of baskets, boxes or crates as ordinarily used in shipping fruit and vegetables, in such manner that the top or cover may not be liable to work loose and at the same time may be readily removed and replaced.

The invention will first be hereinafter more particularly described, with reference to the accompanying drawings, which are to be taken as a part of this specification, and then pointed out in the claims at the end of the description.

In said drawings, Fig. 1 is a perspective view of a basket having a removable top or cover with my improved fastening means applied thereto;

Fig. 2 is a vertical sectional view of the same, illustrating the mode of applying the fastening means to hold the top or cover in place;

Fig. 3 is a perspective view of one of the fasteners removed; and

Fig. 4 is a detail vertical sectional view, illustrating a modification of the invention.

Referring to said drawings, in which the same reference characters are used to denote corresponding parts in different views, the letter A denotes an ordinary fruit or vegetable basket having oppositely disposed handles B and a removable top or cover C secured thereto by means of a slat D having its ends inserted in the loops formed by said handles, so that the cover may be removed by springing apart oppositely disposed portions of the rim sufficiently to permit one end of the slat to be withdrawn from one of said loops, whereupon the cover may be raised and removed by withdrawing the other end of said slat from the other loop. A center-post such as is commonly used in fruit and vegetables baskets may be used in the present case, having one end seated upon the bottom of the basket and the other end seated against the under side of the cover or the center of the slat which has its ends inserted through the loops in the oppositely disposed handles, but such post may be dispensed with. In order to firmly secure the top or cover in place and prevent it from becoming loose by rough handling; I provide removable fasteners I, which are preferably arranged at diametrically opposite points, for securing to the rim of the basket a slat E which preferably extends across the top substantially at right angles to the slat D. In the arrangement shown the slats D and E are crossed at an angle to underlying crossed slats F and G, the ends of which are permanently secured to an underlying hoop H on which the ends of the slat E rest; said slats F and G, together with the slats D and E forming a suitable top or cover for a fruit or vegetable basket with air spaces or openings therein.

The cover being in place, with the ends of the slat D inserted through the loops or handles B, the ends of the slat E are secured and held down upon the rim K by means of the fastening devices I, of the peculiar form shown, each consisting of a piece of wire or metal bent into substantially U-shaped form and having its end portions bent twice at substantially right angles, to form depending legs $i$ having intermediate right angled bends $i^1$ therein and hook-shaped terminals or end portions $i^2$, thus adapting the lower portions of said legs to grip the rim of the basket, on the outer side thereof, and take a firm hold thereon; the fasteners being more or less resilient and placed astride the slat or cross-bar E, one at each end, with their depending legs arranged between the hoop H on the cover and the rim K of the basket, as shown in Fig. 2; said hoop being seated on the right angled bends $i^1$, while the hooks $i^2$ take under and firmly hold the hoop down upon the rim, so that the cover cannot be accidentally displaced, but it may be readily removed by forcibly disengaging said hooks. The hooks are preferably slightly upturned so that their ends may take a firm hold underneath the rim, while the right angled bends in the depending legs form seats or rests for said hoop, the fasteners themselves being supported by the slat or cross-bar E with the bends $i^1$ resting upon the rim K, thus effectually securing the cover in place and holding it firmly down upon said said rim.

It may be desirable in some cases to provide the depending limbs of the fasteners with sharp pointed ends, adapted to be forced through a slat in the body of the basket with which the hook contacts, as shown in Fig. 4 of the drawings.

Having thus described my invention, what I claim as new and desire to secure by Letters-Patent of the United States is:

1. A fruit and vegetable basket cover fastener constructed in substantially U-shaped form with depending limbs each formed with a substantially U-shaped portion adapted to be inserted between the rim of the basket and an overlying hoop on said cover, and to embrace said rim with its hooked end taking under the rim, the body of the fastener being fitted astride a slat or bar extending across the cover.

2. In combination with a fruit or vegetable basket having a removable cover, a fastening device of substantially U-shaped form adapted to fit astride a slat or bar extending across the cover and having depending limbs each formed with a substantially right angled bend and a hook at its free end, said limbs being adapted to be inserted between the rim of the basket and an overlying hoop on the top or cover resting on said right angled bend with the depending end portions of said limbs arranged on the outer side of said rim, and the hooks engaging the under side of the rim.

In testimony whereof I affix my signature in the presence of two witnesses.

GEO. M. BARKER.

Witnesses:
J. M. HANCOCK,
J. N. KALISH.